United States Patent
Beals et al.

[11] 3,983,964
[45] Oct. 5, 1976

[54] DISC BRAKE ASSEMBLY AND METHOD OF USING SAME

[75] Inventors: Duane E. Beals, Decatur; Robert C. Wraight, Morton, both of Ill.

[73] Assignee: Caterpillar Tractor Co., Peoria, Ill.

[22] Filed: Oct. 14, 1975

[21] Appl. No.: 621,930

[52] U.S. Cl. .................. 188/1 A; 92/5 R; 188/71.6; 188/72.4
[51] Int. Cl.² ......................... F16D 66/02
[58] Field of Search ............. 188/1 A, 72.6, 151 A, 188/71.6, 73.6, 71.5, 72.4; 92/5 R; 116/114 Q; 192/30 W; 340/52 A; 200/61.4, 61.44

[56] References Cited
UNITED STATES PATENTS

| | | |
|---|---|---|
| 3,189,129 | 6/1965 | Burnett .......................... 188/73.6 |
| 3,533,491 | 10/1970 | Svenson ......................... 188/1 A |
| 3,662,863 | 5/1972 | Dombeck ........................ 188/1 A |
| 3,727,711 | 4/1973 | Sebern ......................... 188/71.5 X |

Primary Examiner—Trygve M. Blix
Assistant Examiner—Jesus D. Sotelo
Attorney, Agent, or Firm—Frank L. Hart

[57] ABSTRACT

A disc brake assembly of a vehicle has an actuator for actuating the disc brake and a housing that is positioned about the actuator. An element is provided for observing an identification mark positioned at a preselected location on the actuator adjacent a port of the housing. In the method of the invention, the brake of the vehicle is used and worn brake discs are replaced in response to the mark on the actuator being at a location spaced at least a preselected distance from the location of the mark prior to wear of the brake discs.

10 Claims, 4 Drawing Figures

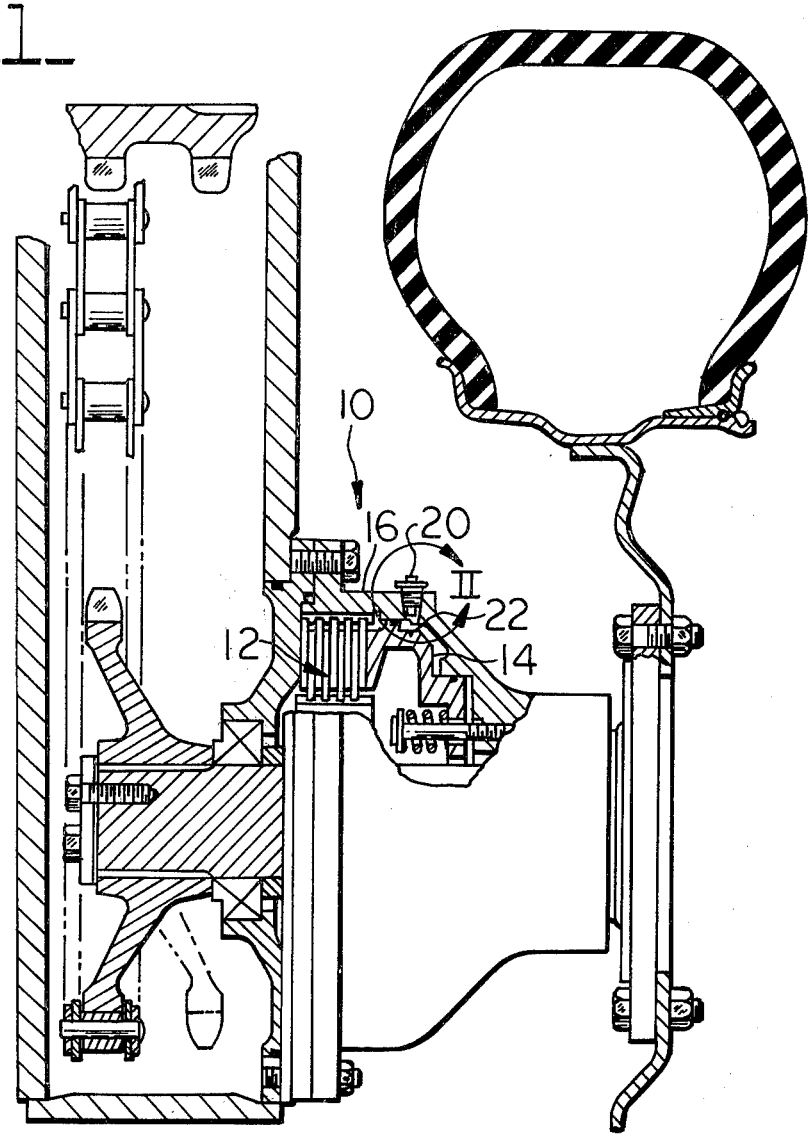
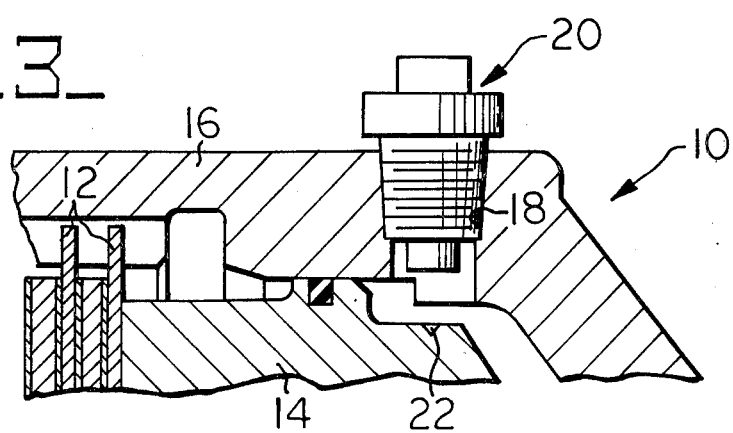

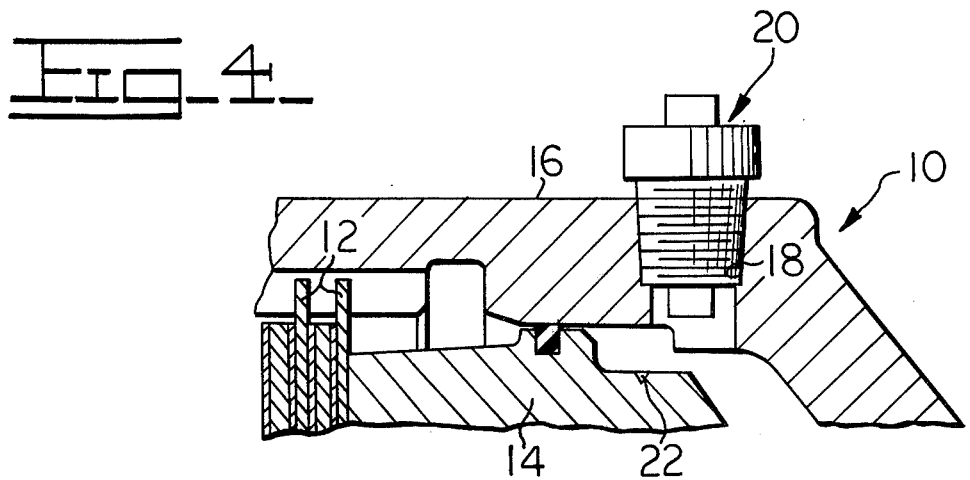
Fig_4
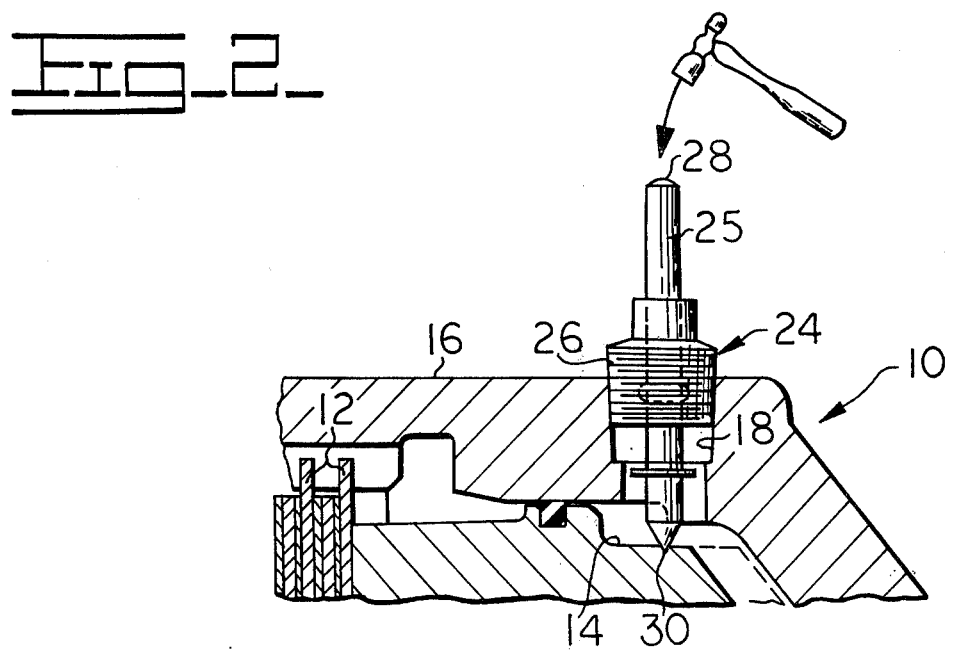
Fig_2

DISC BRAKE ASSEMBLY AND METHOD OF USING SAME

BACKGROUND OF THE INVENTION

In heretofore utilized vehicle disc brake assemblies, such as best shown in U.S. Pat. No. 3,727,711 — Sebern, the actuator and brake discs are enclosed in a brake housing. In order to determine the amount of wear that the brake discs had received during operation of the vehicle, it was necessary to disassemble the brake assembly and visually inspect the discs. This operation resulted in a considerable waste of labor and time where the operator had misjudged the wear rate of the discs and visual inspection of these discs disclosed that the brake discs were not so sufficiently worn as to require replacement. Conversely, danger could be encountered where an operator allows discs to wear excessively to a point that the efficiency of the braking system was less than desirable.

This invention therefore resides in apparatus and method whereby an operator can determine the extent of wear of the brake discs of the brake assembly without dismantling the brake assembly.

BRIEF DESCRIPTION OF THE DRAWINGS

FIG. 1 is a diagrammatic view in partial section of an example disc brake assembly;

FIG. 2 is a diagrammatic view in partial section of a portion of the brake assembly of FIG. 1 with the identification mark of this invention being applied to the brake actuator;

FIG. 3 is a diagrammatic view in partial section of a portion of the brake assembly of FIG. 1 showing the location of the identification mark relative to a port of the brake housing; and FIG. 4 is a diagrammatic view in partial section of a portion of the brake assembly of FIG. 1 showing the location of the identification mark relative to the port on a brake having worn brake discs.

DETAILED DESCRIPTION OF THE INVENTION

Referring to FIG. 1, a disc brake 10 of a vehicle has discs 12 which are actuated by an actuator 14 such as a spring or piston, for example. The discs 12 and actuator 14 are enclosed by a brake housing 16. The brake housing has a port 18 which extends through the housing 16 at a location adjacent the actuator 14. The port 18 is sealed by a removable plug 20 that is threaded to mate with threads of the port 18. As is known in the art, the port 18 and plug 20 are generally located on a lower portion of the housing 16 and utilized for draining condensate and other material from the housing 16 and for maintaining cooling fluid in the housing 16. The port 18 can, however, be located on an upper portion of the housing.

In the operation of the disc brake 10, the actuation of the brake causes the actuator 14 to urge the discs 12 into forcible engagement one with the other. FIG. 2 shows the brake with the actuator 14 in the actuated position. Upon deactuation of the brake 10, the actuator 14 will move laterally to the normal position, as shown by broken lines.

In the method of this invention an inspection mark 22 (better seen in FIGS. 3 and 4) is positioned on the actuator 14 at a location adjacent the port 18 in the actuated condition of the brake 10. This mark 22 can be placed on actuator 14 during manufacture of the piston 14 or after the brake assembly 10 is mounted on the vehicle.

It should be understood that the term "actuator" as used herein includes any portion of the brake assembly that moves in a linear direction for engaging and disengaging the brake.

FIG. 2 shows one method of placing the identification mark 22 on the assembled brake. In this method, a marking plug 24 is provided which has a marking element 25 slidably, sealably mounted through the marking plug body 26. The outer end 28 of the marking element 25 is generally blunted for driving an opposed cutting end 30 of the marking element 25 into the piston 14.

It will be noticed from a study of FIG. 2 that the marking plug 24 not only provides a seal to prevent fluid from leaking from the housing 16 during marking of the actuator 14, but additionally provides a guide means to assure marking of the actuator 14 at a preselected position relative to the centerline of the port 18.

Referring to FIG. 3, after the identification mark 22 is provided, said mark 22 is moved to a position adjacent the port 18 upon actuation of the brake 10 so long as the brake discs are not undesirably worn.

As can be seen in FIG. 4, as the discs become worn, the actuator must move farther laterally to place the worn discs 12 into forcible engagement thereby causing the identification mark 22 to be at a position spaced from the original position of the identification mark 22 relative to the port 18.

In the preferred method of this invention, the port 18 is sized relative to the disc assembly such that when the discs 12 have become sufficiently worn to be replaced, the identification mark will be laterally spaced from beneath the port 18 in the actuated condition of the brake. However, it should be understood that the distance between the mark's original location and a subsequent location can be measured by other means. For example, a viewing plug 20 can be constructed having a transparent, calibrated viewing element of predetermined size and shape extending therethrough. The viewing element can then be urged through the plug body, as was the marking element, and into viewing range of or contact with the actuator 14. Calibration markings on the end of the viewing element can then be viewed with relation to the identification mark 22 to measure the amount of disc wear.

Where the brake assembly 10 does not have a cooling fluid therein, or where the cooling fluid is relatively clear, the sealing plug 20 can be constructed with a portion of the plug 20 being transparent for observing the identification mark therethrough.

By so constructing and utilizing this invention, a brake wear indication can be obtained without providing additional elements associated with the brake. This invention therefore avoids the waste of utilizing and maintaining additional elements connected to the brake, as in heretofore utilized brake systems. Further, the invention is adapted for use on disc assemblies where the thickness of the brake discs have been changed.

Other aspects, objects, and advantages of this invention can be obtained from a study of the disclosure and appended claims.

What is claimed is:

1. A method for determining the wear of a brake of a vehicle, said brake having a brake disc actuated by an actuator element positioned within a brake housing having a port through said brake housing at a location adjacent said actuator, said actuator being movable relative to the port between an actuated position and an unactuated position, comprising:

placing an inspection mark on the actuator at a location adjacent the port in the actuated position of the actuator;

using the brake during operation of the vehicle; and observing through the port the portion of the actuator adjacent the port in the actuated position for determining the wear of the brake.

2. A method, as set forth in claim 1, including passing a tool through the port and into contact with the actuator at the actuated position of the brake, and marking the actuator with the tool for placing the inspection mark on the actuator.

3. A method, as set forth in claim 2, including sealing the port about the tool during marking of the actuator.

4. A method, as set forth in claim 1, including sealing the port with a plug having a construction sufficient for viewing the identification mark of the actuator through the seal.

5. In a disc brake assembly of a vehicle having an actuator connected to a brake disc and a brake housing positioned about the actuator and having a threaded port through the housing adjacent the actuator and a cap covering the port, said actuator being movable relative to the port between an actuated position and an unactuated position, the improvement comprising:

an inspection mark positioned at a preselected position on the actuator at a location adjacent the port in the actuated position of the actuator; and means for observing through the port a portion of the actuator adjacent the port in the actuated position.

6. Apparatus, as set forth in claim 5, wherein said means is a plug having threads mateable with threads of the port and said plug having a transparent portion.

7. A method of determining the wear of a brake of a vehicle, said brake having a brake disc actuated by an actuator element positioned within a brake housing having a port through said brake housing at a location adjacent said actuator, said actuator and brake disc being movable between an actuated position and an unactuated position, comprising:

passing a tool through the port and into contact with the actuator at the actuated condition of the brake;

marking the actuator for placing an inspection mark on the actuator at a location adjacent the port in the actuated condition of the brake;

using the brake during operation of the vehicle; and observing through the port the portion of the actuator adjacent the port in the actuated condition of the brake.

8. A method, as set forth in claim 7, including sealing the port about the tool during marking of the actuator.

9. A method, as set forth in claim 7, including sealing the port with a plug having a construction sufficient for viewing the identification mark of the actuator through the seal.

10. In a disc brake assembly of a vehicle having an actuator connected to a disc of the brake and a brake housing positioned about the actuator and having a port through the housing adjacent the actuator, said actuator being movable relative to the port between an actuated position and an unactuated position, the improvement comprising:

an inspection mark positioned on the actuator at a location adjacent the port in the actuated position of the actuator; and a plug having threads mateable with threads of the port, said plug having a transparent portion for observing through the port a portion of the actuator adjacent the port in the actuated condition of the actuator.

* * * * *